Sept. 20, 1932.  G. WALTHER  1,878,213
METAL WHEEL
Filed Oct. 3, 1927
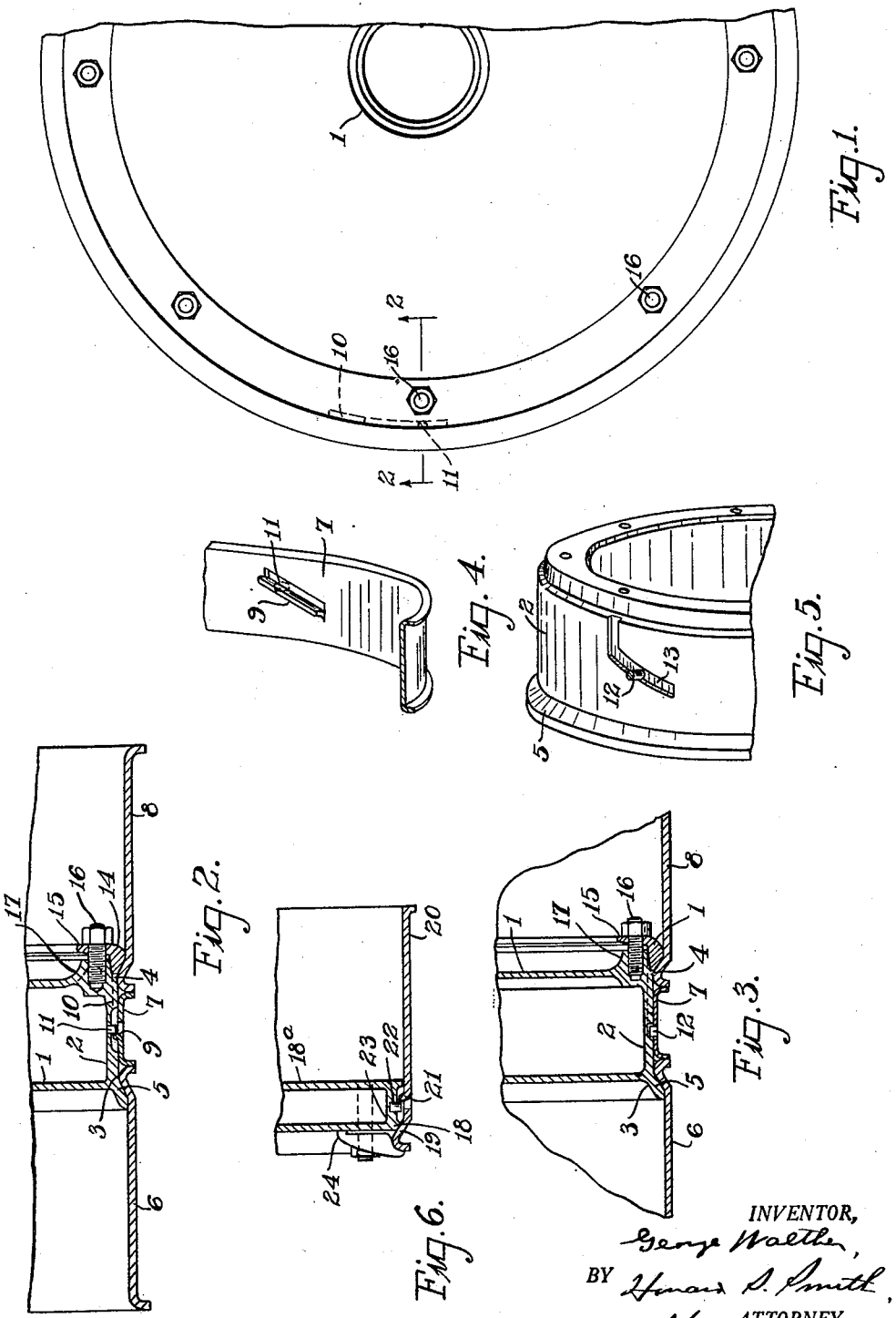
INVENTOR,
George Walther,
BY Howard D. Smith,
His ATTORNEY.

Patented Sept. 20, 1932

1,878,213

UNITED STATES PATENT OFFICE

GEORGE WALTHER, OF NEAR DAYTON, OHIO, ASSIGNOR TO THE DAYTON STEEL FOUNDRY COMPANY, OF DAYTON, OHIO, A CORPORATION OF OHIO

METAL WHEEL

Application filed October 3, 1927. Serial No. 223,512.

This invention relates to new and useful improvements in metal wheels.

It is one of the principal objects of my invention to provide a duo-rim metal wheel in which the inboard tire rim is forced to a true position upon its beveled seat by moving the spacing band circumferentially. For this purpose the spacing band is provided with a cam projection, preferably turned up from it, for engagement with a projection on the felloe or spider portion of the wheel. When the cam projection on the spacer engages the projection on the felloe or spider, the spacer, upon being moved circumferentially, will force the inboard tire rim to its true or home position upon its beveled seat, thus providing an easy and efficient method of accomplishing this purpose.

Other important and incidental objects will be brought out in the following specification and particularly set forth in the subjoined claims.

In the accompanying drawing illustrating my invention, Figure 1 is a front view of my improved metal wheel. Figure 2 is a radial sectional view taken through the same on the line 2—2 of Figure 1, showing the preferred cam means for forcing the inboard tire rim to its true position on its beveled seat by moving the spacing band circumferentially. Figure 3 is a sectional view showing the spacing band formed with a pin that is adapted to enter a groove on the felloe to achieve the object of my invention. Figure 4 is a perspective view of a spacing band from which a cam projection has been turned for engagement with a pin on the felloe. Figure 5 is a perspective view of a wheel showing a groove in the felloe to receive a pin on the spacing band. And Figure 6 is a radial sectional view taken through a single tire wheel equipped with my rim alining means.

The accompanying drawing illustrates a metal wheel 1 formed with a felloe 2 which provides two rim seats 3 and 4. The inboard tire rim seat 3 is formed with a bevel 5 as shown in Figure 2 to receive the beveled laterally inward part of a tire rim 6 whose flanged edge a spacing band 7 is adapted to engage. The other side of this spacing band is adapted to be engaged by the transversely inward flanged edge of an outboard tire rim 8 which is supported by the seat 4.

After the inboard tire rim 6 is applied to its beveled seat 3, the spacing band 7 is put on the felloe ready for engagement with the inboard tire rim 6. For the purpose of forcing the latter to its true or home position upon its beveled seat 3, the following cam means are provided.

Turned up from a peripheral portion of the spacer band 7 is an oblique cam projection 9 adapted to pass freely through a groove 10 in the seat 4 and felloe when the spacer is applied to the wheel.

Upon the felloe 2 a round pin 11 is secured for engagement by the cam projection 9 on the spacer band 7 when the latter is moved circumferentially. This circumferential movement of the spacer band will cause it to move sidewise to force the inboard tire rim 6 to its true or home position on its beveled seat 3. (See Figures 2 and 3.)

In Figures 3 and 5, I have shown a pin 12 secured to the spacing band 7 for engagement in an oblique groove 13 in the felloe 2, whereby, when the spacing band 7 is moved circumferentially, it will also move sidewise to force the inboard tire rim to its true or home position upon its beveled seat 3.

In each instance, the band 7 not only serves as a spacing abutment for the tire rims 6 and 8, but as a means, when moved circumferentially, for forcing the inboard tire rim 6 to its true or home position upon its seat 3.

After the spacing band 7 has been moved circumferentially a sufficient distance to properly position the tire rim 6 upon its seat, the tire rim 8 is applied and forced laterally inward against the spacing band by wedge rings 14. Each wedge ring 14 has a radial flange portion 15 containing a hole through which a stud 16 is screwed into a boss 17 on the felloe portion of the wheel. By means of these wedge rings 14, the tire rims 6 and 8, with the spacing band 7 between them, are firmly held upon their seats 3 and 4.

In Figure 6 I have illustrated a portion of a single-rim spoke wheel which is provided with a beveled tire rim seat 18 for the beveled part 19 of a tire rim 20.

For the purpose of forcing this single rim 20 to its true position upon its beveled seat 18, there is turned from said rim a cam projection 21 similar to the camp projection 9. This projection is adapted to engage a pin 22 secured in the web 23 whereby, when the rim 20 is moved circumferentially, it will be forced to its true position upon the seat 19. By means of clamps 24 secured to the spokes 18ª, one of which is shown in Figure 6, the tire rim may be firmly held in its true position upon its beveled seat 18.

I do not wish to be limited to the details of construction and arrangement herein shown and described, and any changes or modifications may be made therein within the scope of the subjoined claims.

Having described my invention, I claim:

1. A metal wheel provided with two tire rim seats, a tire rim for each seat, a spacer between said rims, cam means actuated by the spacer, when moved circumferentially, to force the inboard tire rim to its true or home position upon its seat and clamping means for holding the outboard rim in place upon its seat.

2. A metal wheel provided with two tire rim seats, a tire rim for each seat, a spacer between said seats, a cam projection on said spacer, a projection on the wheel between said seats, the latter projection adapted to be engaged by the cam projection on the spacer, when the latter is moved circumferentially to force the inboard tire rim to its true or home position upon its seat and clamping means for holding the outboard rim in place upon its seat.

3. A metal wheel provided with two tire rim seats, a tire rim for each seat, an abutting spacing band between said seats, an oblique cam projection on said spacing band, a projection on the wheel between said seats, the latter projection adapted to be engaged by the cam projection on the spacing band when the latter is moved circumferentially, to force the inboard tire rim to its true or home position on its seat and clamping means for holding the outboard rim in place upon its seat.

4. A metal wheel provided with two tire rim seats, a tire rim for each seat, an abutting spacing band between said seats, an oblique cam projection turned up from said spacing band, a pin on the wheel between said seats, the pin adapted to be engaged by the cam projection on the spacing band when the latter is moved circumferentially, to force the inboard tire rim to its true or home position upon its seat and clamping means for holding the outboard rim in place upon its seat.

5. A metal wheel having an extended hub portion, two tire rim seats on said extended hub portion, a tire rim on each seat, a circumferentially movable spacing band between said tire rims, a slot and projection connection between said extended hub portion and the spacing band to force the inboard tire rim to its true or home position upon its seat when the band is moved circumferentially, and clamping means for holding the outboard tire rim in place upon its seat.

6. A metal wheel provided with an extended hub portion formed with two tire rim seats, a tire rim supported at its laterally inward edge upon each seat, a cam spacer band upon the extended hub portion, adapted to be moved circumferentially, to force the inboard tire rim to its true or home position upon its seat, and clamping means for holding the outboard tire rim in place upon its seat.

7. A vehicle wheel body provided with a tire rim seat, a tire rim mounted on said seat, a spacer band mounted adjacent to and in engagement with said tire rim, cooperating means on said spacer band and wheel body operative through circumferential movement of said spacer band to hold said spacer band in different transverse adjusted positions in respect to said wheel body to thus position said tire rim in its true home position aligned in a plane at right angles to the axis of the said wheel body, a second tire rim mounted adjacent to and in engagement with said spacer band; and means for securing said second tire rim in such position relative to said spacer band and to said wheel body.

8. A vehicle wheel body provided with a tire rim seat; a tire rim mounted on said tire rim seat; a spacer band mounted adjacent to and in engagement with said tire rim; cooperating camming means on said spacer band and said wheel body whereby circumferential movement of said spacer band forces said tire rim to its true home position upon said tire rim seat aligned in a plane at right angles to the axis of the said wheel body; a second tire rim mounted adjacent to and in engagement with said spacer band; and means for securing said second tire rim in such position relative to said spacer band and to said wheel body.

In testimony whereof I have hereunto set my hand this 30 day of September, 1927.

GEORGE WALTHER.